(12) United States Patent
Cook et al.

(10) Patent No.: US 10,630,372 B2
(45) Date of Patent: *Apr. 21, 2020

(54) CELLULAR SIGNAL BOOSTER WITH REDUNDANT PATHS FOR THE SAME SELECTED BAND

(71) Applicant: WILSON ELECTRONICS, LLC, St. George, UT (US)

(72) Inventors: Patrick Cook, Cedar City, UT (US); Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/216,745

(22) Filed: Dec. 11, 2018

(65) Prior Publication Data
US 2019/0260426 A1    Aug. 22, 2019

Related U.S. Application Data

(63) Continuation of application No. 15/354,802, filed on Nov. 17, 2016, now Pat. No. 10,153,826.
(Continued)

(51) Int. Cl.
*H04B 7/15* (2006.01)
*H04B 7/155* (2006.01)
(Continued)

(52) U.S. Cl.
CPC ......... *H04B 7/15507* (2013.01); *H01Q 1/241* (2013.01); *H04B 1/3888* (2013.01);
(Continued)

(58) Field of Classification Search
CPC ................................................ H04B 7/14–216
(Continued)

(56) References Cited

U.S. PATENT DOCUMENTS 4,776,032 A    10/1988  Odate et al.
5,303,395 A     4/1994  Dayani
(Continued)

FOREIGN PATENT DOCUMENTS

EP           1525678 B1    7/2008

OTHER PUBLICATIONS

ADL5513; "1 MHz to 4 GHz, 80 dB Logarithmic Detector / Controller"; Data Sheet; (2008); 25 pages.
(Continued)

*Primary Examiner* — Philip Sobutka
(74) *Attorney, Agent, or Firm* — Thorpe North & Western

(57) ABSTRACT

A technology is described for a signal booster. The signal booster can include a selected number of uplink transmission paths. Each uplink transmission path can be configured to amplify an uplink signal on a selected band. The signal booster can include a selected number of downlink transmission paths. Each downlink transmission path can be configured to amplify a downlink signal on a selected band. One or more of the selected number of uplink transmission paths or the selected number of downlink transmission paths can include multiple parallel signal paths that are redundant for a same selected band, respectively.

24 Claims, 9 Drawing Sheets

Related U.S. Application Data

(60) Provisional application No. 62/256,584, filed on Nov. 17, 2015.

(51) Int. Cl.
*H04B 17/345* (2015.01)
*H04B 7/026* (2017.01)
*H04B 7/12* (2006.01)
*H04B 17/318* (2015.01)
*H01Q 1/24* (2006.01)
*H04B 1/3888* (2015.01)
*H04W 16/26* (2009.01)
*H04W 52/14* (2009.01)
*H04W 52/24* (2009.01)

(52) U.S. Cl.
CPC ............... *H04B 7/026* (2013.01); *H04B 7/12* (2013.01); *H04B 7/15535* (2013.01); *H04B 7/15542* (2013.01); *H04B 17/318* (2015.01); *H04B 17/345* (2015.01); *H04W 16/26* (2013.01); *H04W 52/143* (2013.01); *H04W 52/146* (2013.01); *H04W 52/245* (2013.01)

(58) Field of Classification Search
USPC ....................................................... 455/7–25
See application file for complete search history.

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,020,796 A * | 2/2000 | Collar | H04B 7/2045 333/101 |
| 6,711,388 B1 | 3/2004 | Neitiniemi | |
| 6,718,160 B2 | 4/2004 | Schmutz | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 8,790,241 B2 | 7/2014 | Edwin et al. | |
| 8,818,263 B1 | 8/2014 | Ashworth et al. | |
| 8,867,572 B1 | 10/2014 | Zhan | |
| 10,153,826 B2 * | 12/2018 | Cook | H01Q 1/241 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2007/0218951 A1 | 9/2007 | Risheq et al. | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0196215 A1 * | 8/2009 | Sabat | H03G 3/3047 370/315 |
| 2010/0142416 A1 | 6/2010 | Kim | |
| 2011/0085477 A1 | 4/2011 | Schiff | |
| 2011/0151775 A1 | 6/2011 | Kang et al. | |
| 2013/0077502 A1 * | 3/2013 | Gainey | H04B 7/15578 370/252 |
| 2014/0011442 A1 | 1/2014 | Dussmann | |
| 2015/0009892 A1 | 1/2015 | Chang et al. | |
| 2015/0079898 A1 | 3/2015 | Pergal | |

OTHER PUBLICATIONS

HMC713LP3E; "54 dB, Logarithmic Detector / Controller, 50—8000 MHz"; Data Sheet (2010); 12 pages.
HMC909LP4E; "RMS Power Detector Single-Ended, DC—5.8 GHz"; Data Sheet; (2010); 21 pages.
Mjoose.; "Mjoose Phone Case." https://mjoose.com/ ; 7 Pages.
PIC16F873; "28/40-Pin 8-Bit CMOS Flash Microcontrollers"; Data Sheet; (2001); 218 pages.
3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

* cited by examiner

CELLULAR SIGNAL BOOSTER WITH REDUNDANT PATHS FOR THE SAME SELECTED BAND

RELATED APPLICATIONS

The present application is a continuation of U.S. patent application Ser. No. 15/354,802 filed Nov. 17, 2016, which claims the benefit of U.S. Provisional Patent Application No. 62/256,584, filed Nov. 17, 2015, the entire specifications of which are hereby incorporated by reference in their entirety for all purposes.

BACKGROUND

Signal boosters, or signal repeaters, can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
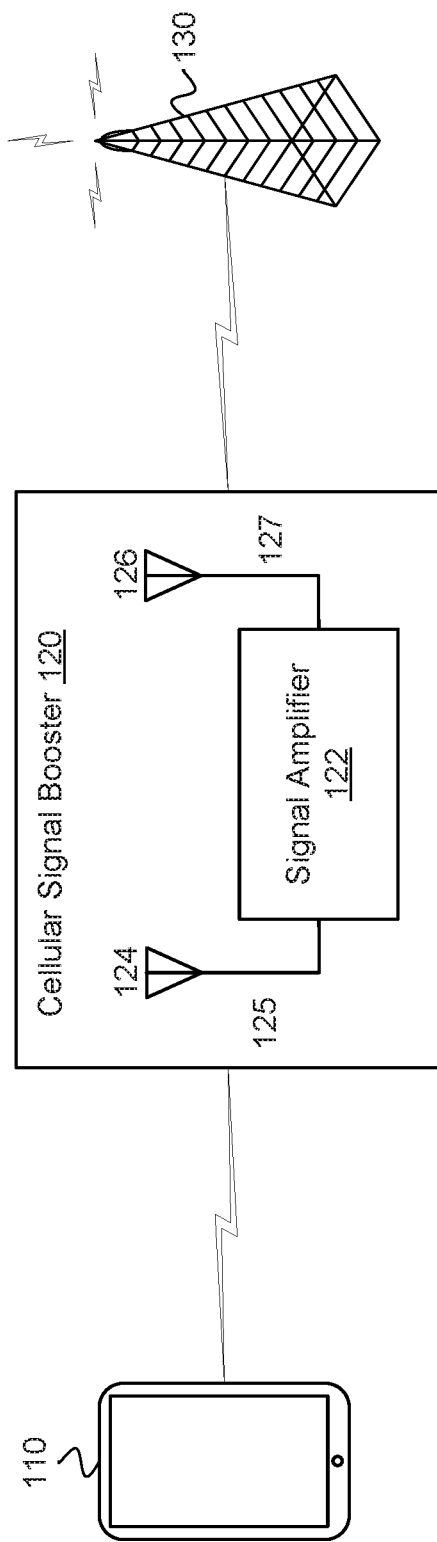
FIG. 1 illustrates a cellular signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Technology is described for a signal booster that includes a selected number of uplink transmission paths and a selected number of downlink transmission paths. The signal booster can also be referred to as a repeater or a signal repeater. Each uplink transmission path can be configured to amplify an uplink signal at a selected band, and each downlink transmission path can be configured to amplify a downlink signal at a selected band. In one example, the selected number of uplink transmission paths in the signal booster does not equal the selected number of downlink transmission paths in the signal booster. In one configuration, the signal booster can include a controller operable to perform network protection in order to protect a cellular network from overload or noise floor increase. The controller can adjust a gain or noise power for each band in the selected number of uplink transmission paths based on data from each band in the selected number of downlink transmission paths. More specifically, in order to protect the cellular network from overload or noise floor increase, the controller can identify a booster station coupling loss (BSCL) or a received signal strength indication (RSSI) for each band in the selected number of downlink transmission paths. The controller can identify one or more downlink transmission paths that correspond to a minimum BSCL or RSSI for each band as compared to other downlink transmission paths in the signal booster. The controller can adjust an uplink gain or noise power for each band in the selected number of uplink transmission paths based on the minimum BSCL or RSSI for each band.

FIG. 1 illustrates an exemplary cellular signal booster 120 in communication with a wireless device 110 and a base station 130. The cellular signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the cellular signal booster 120 can amplify or boost uplink signals and/or downlink signals bi-directionally. In one example, the cellular signal booster 120 can be at a fixed location, such as in a home or office. Alternatively, the cellular signal booster 120 can be attached to a mobile object, such as a vehicle or a wireless device 110.

In one configuration, the cellular signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the cellular signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the cellular signal booster 120 used to amplify the uplink and/or a downlink signal is a handheld booster. The handheld booster can be implemented in a sleeve of the wireless device 110. The wireless device sleeve may be attached to the wireless device 110, but may be removed as needed. In this configuration, the cellular signal booster 120 can automatically power down or cease amplification when the wireless device 110 approaches a particular base station. In other words, the cellular signal booster 120 may determine to stop performing signal amplification when the quality of uplink and/or downlink signals is above a defined threshold based on a location of the wireless device 110 in relation to the base station 130.

In one example, the cellular signal booster 120 can include a battery to provide power to various components, such as the signal amplifier 122, the integrated device antenna 124 and the integrated node antenna 126. The battery can also power the wireless device 110 (e.g., phone or tablet). Alternatively, the cellular signal booster 120 can receive power from the wireless device 110.

In one configuration, the cellular signal booster 120 can be a Federal Communications Commission (FCC)-compatible consumer signal booster. As a non-limiting example, the cellular signal booster 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The cellular signal booster 120 can be configured to automatically self-monitor its operation to ensure compliance with applicable noise and gain limits. The cellular signal booster 120 can either self-correct or shut down automatically if the cellular signal booster's operations violate the regulations defined in FCC Part 20.21.

In one configuration, the cellular signal booster 120 can improve the wireless connection between the wireless device 110 and the base station 130 (e.g., cell tower) or another type of wireless wide area network (WWAN) access point (AP). The cellular signal booster 120 can boost signals for cellular standards, such as the Third Generation Partnership Project (3GPP) Long Term Evolution (LTE) Release 8, 9, 10, 11, or 12 standards or Institute of Electronics and Electrical Engineers (IEEE) 802.16. In one configuration, the cellular signal booster 120 can boost signals for 3GPP LTE Release 12.0.0 (July 2013) or other desired releases. The cellular signal booster 120 can boost signals from the 3GPP Technical Specification 36.101 (Release 12 Jun. 2015) bands or LTE frequency bands. For example, the cellular signal booster 120 can boost signals from the LTE frequency bands: 2, 4, 5, 12, 13, 17, and 25. In addition, the cellular signal booster 120 can boost selected frequency bands based on the country or region in which the signal booster is used.

The number of LTE frequency bands and the level of signal improvement can vary based on a particular wireless device, cellular node, or location. Additional domestic and international frequencies can also be included to offer increased functionality. Selected models of the cellular signal booster 120 can be configured to operate with selected frequency bands based on the location of use. In another example, the cellular signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communications.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple cellular signal boosters can be used to amplify UL and DL signals. For example, a first cellular signal booster can be used to amplify UL signals and a second cellular signal booster can be used to amplify DL signals. In addition, different cellular signal boosters can be used to amplify different frequency ranges.

In one configuration, when the cellular signal booster 120 is a handheld booster, a phone-specific case of the handheld booster can be configured for a specific type or model of wireless device. The phone-specific case can be configured with the integrated device antenna 124 located at a desired location to enable communication with an antenna of the specific wireless device. In addition, amplification and filtering of the uplink and downlink signals can be provided to optimize the operation of the specific wireless device. In one example, the handheld booster can be configured to communicate with a wide range of wireless devices. In another example, the handheld booster can be adjustable to be configured for multiple wireless devices.

In one configuration, when the cellular signal booster 120 is a handheld booster, the handheld booster can be configured to identify when the wireless device 110 receives a relatively strong downlink signal. An example of a strong downlink signal can be a downlink signal with a signal strength greater than approximately −80 dBm. The handheld booster can be configured to automatically turn off selected features, such as amplification, to conserve battery life. When the handheld booster senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the handheld booster can be designed, certified and produced in view of a specific absorption rate (SAR). Many countries have SAR limits which can limit the amount of RF radiation that can be transmitted by a wireless device. This can protect users from harmful amounts of radiation being absorbed in their hand, body, or head. In one example, when allowable SAR values are exceeded, a telescoping integrated node antenna may help to remove the radiation from the immediate area of the user. In another example, the handheld booster can be certified to be used away from a user, such as in use with Bluetooth headsets, wired headsets, and speaker-phones to allow the SAR rates to be higher than if the handheld booster were used in a location adjacent a user's head. Additionally, Wi-Fi communications can be disabled to reduce SAR values when the SAR limit is exceeded.

In one example, the handheld booster can also include one or more of: a waterproof casing, a shock absorbent casing, a flip-cover, a wallet, or extra memory storage for the wireless device. In one example, extra memory storage can be achieved with a direct connection between the handheld booster and the wireless device 110. In another example, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the handheld booster with the wireless device 110 to enable data from the wireless device 110 to be communicated to and stored in the extra memory storage that is integrated in the handheld booster. Alternatively, a connector can be used to connect the wireless device 110 to the extra memory storage.

In one example, the handheld booster can include photovoltaic cells or solar panels as a technique of charging the integrated battery and/or a battery of the wireless device 110. In another example, the handheld booster can be configured to communicate directly with other wireless devices with handheld boosters. In one example, the integrated node antenna 126 can communicate over Very High Frequency (VHF) communications directly with integrated node antennas of other handheld boosters. The handheld booster can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with handheld boosters. This configuration can also allow users to send text messages, initiate phone calls, and engage in video communications between wireless devices with handheld boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other handheld boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. In another example, the handheld booster can be configured to determine the SAR value. The handheld booster can be configured to disable cellular communications or Wi-Fi communications when a SAR limit is exceeded.

In one configuration, the cellular signal booster 120 can be configured for satellite communication. In one example, the integrated node antenna 126 can be configured to act as a satellite communication antenna. In another example, a separate node antenna can be used for satellite communications. The cellular signal booster 120 can extend the range of coverage of the wireless device 110 configured for satellite communication. The integrated node antenna 126 can receive downlink signals from satellite communications for the wireless device 110. The cellular signal booster 120 can filter and amplify the downlink signals from the satellite communication. In another example, during satellite communications, the wireless device 110 can be configured to couple to the cellular signal booster 120 via a direct connection or an ISM radio band. Examples of such ISM bands include 2.4 GHz, 3.6 GHz, 4.9 GHz, 5 GHz, or 5.9 GHz.

Figure 2:
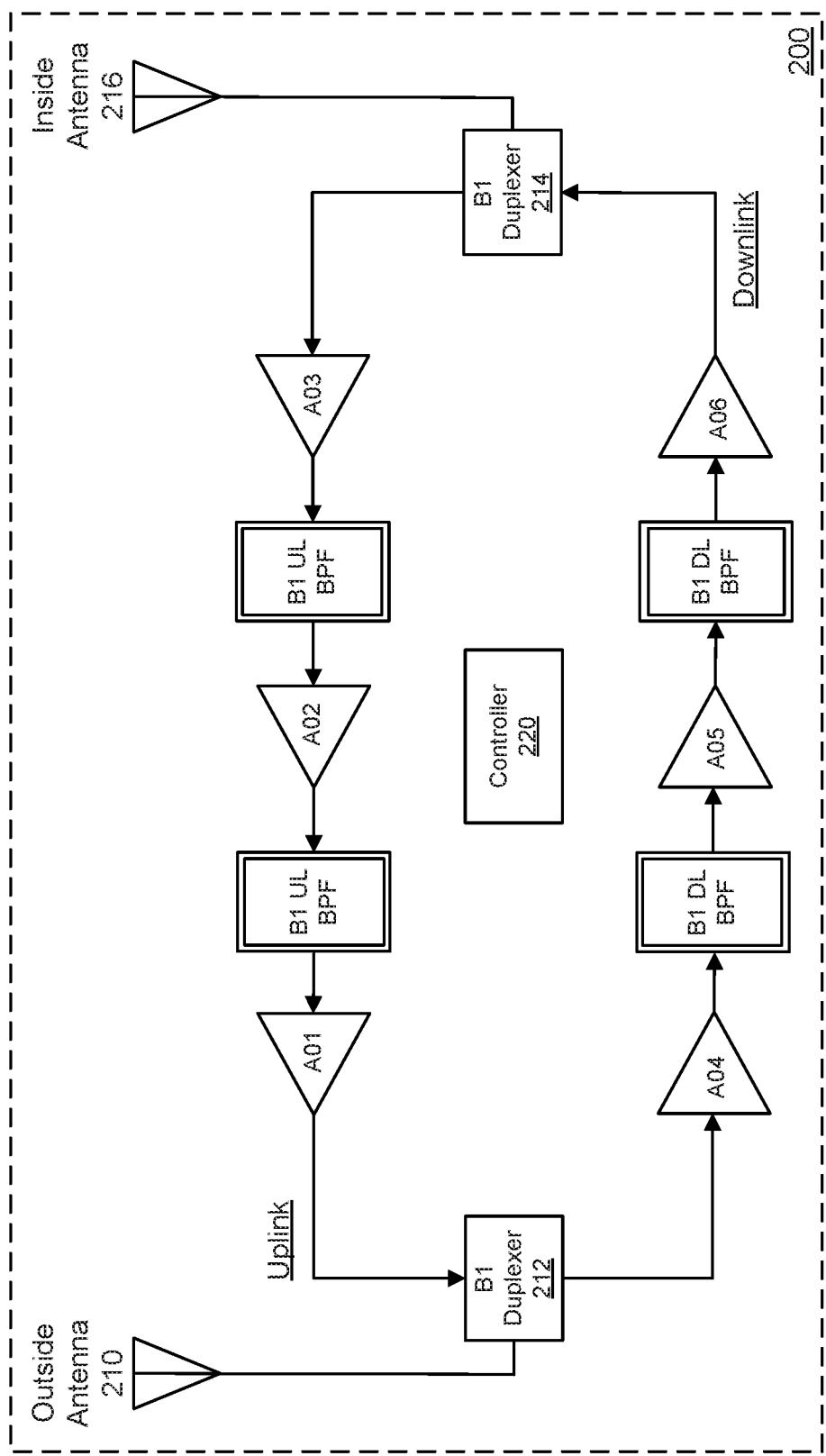
FIG. 2 illustrates a cellular signal booster configured to amplify uplink (UL) and downlink (DL) signals of a particular frequency band using a series of amplifiers and band pass filters in accordance with an example.

FIG. 2 illustrates an exemplary cellular signal booster 200 configured to amplify uplink (UL) and downlink (DL) signals of a particular frequency band using a controller 220. The controller 220 can perform gain control, oscillation detection and various other functions. An outside antenna 210, or an integrated node antenna, can receive a downlink signal. For example, the downlink signal can be received from a base station (not shown). The downlink signal can be associated with a defined frequency band (e.g., B1). The downlink signal can be provided to a first B1 duplexer 212. The first B1 duplexer 212 can create a B1 downlink signal path. Therefore, a downlink signal that is associated with B1 can travel along the B1 downlink signal path towards a second B1 duplexer 214. After passing the first B1 duplexer 212, the downlink signal can travel through a series of amplifiers (e.g., A04, A05 and A06) and downlink band pass filters (BPF) towards the second B1 duplexer 214. After the downlink signal reaches the second B1 duplexer 214, the downlink signal has been amplified and filtered in accordance with the type of amplifiers and BPFs included in the cellular signal booster 200. The downlink signals from the second B1 duplexer 214 can be provided to an inside antenna 216, or an integrated device antenna. The inside antenna 216 can communicate the amplified downlink signal to a wireless device (not shown), such as a mobile phone.

In one configuration, the inside antenna 216 can receive an uplink signal. For example, the uplink signal can be received from the wireless device. The uplink signal can be associated with a defined frequency band (e.g., B1). The uplink signal can be provided to the second B1 duplexer 214. The second B1 duplexer 214 can create a B1 uplink signal path. Therefore, an uplink signal that is associated with B1 can travel along the B1 uplink signal path towards the first B1 duplexer 212. After passing the second B1 duplexer 214, the uplink signal can travel through a series of amplifiers (e.g., A01, A02 and A03) and uplink band pass filters (BPF) towards the first B1 duplexer 212. After the uplink signal reaches the first B1 duplexer 212, the uplink signal has been amplified and filtered in accordance with the type of amplifiers and BPFs included in the cellular signal booster 200. The uplink signal from the first B1 duplexer 212 can be provided to the outside antenna 210. The outside antenna 210 can communicate the amplified uplink signal to the base station.

Figure 3:
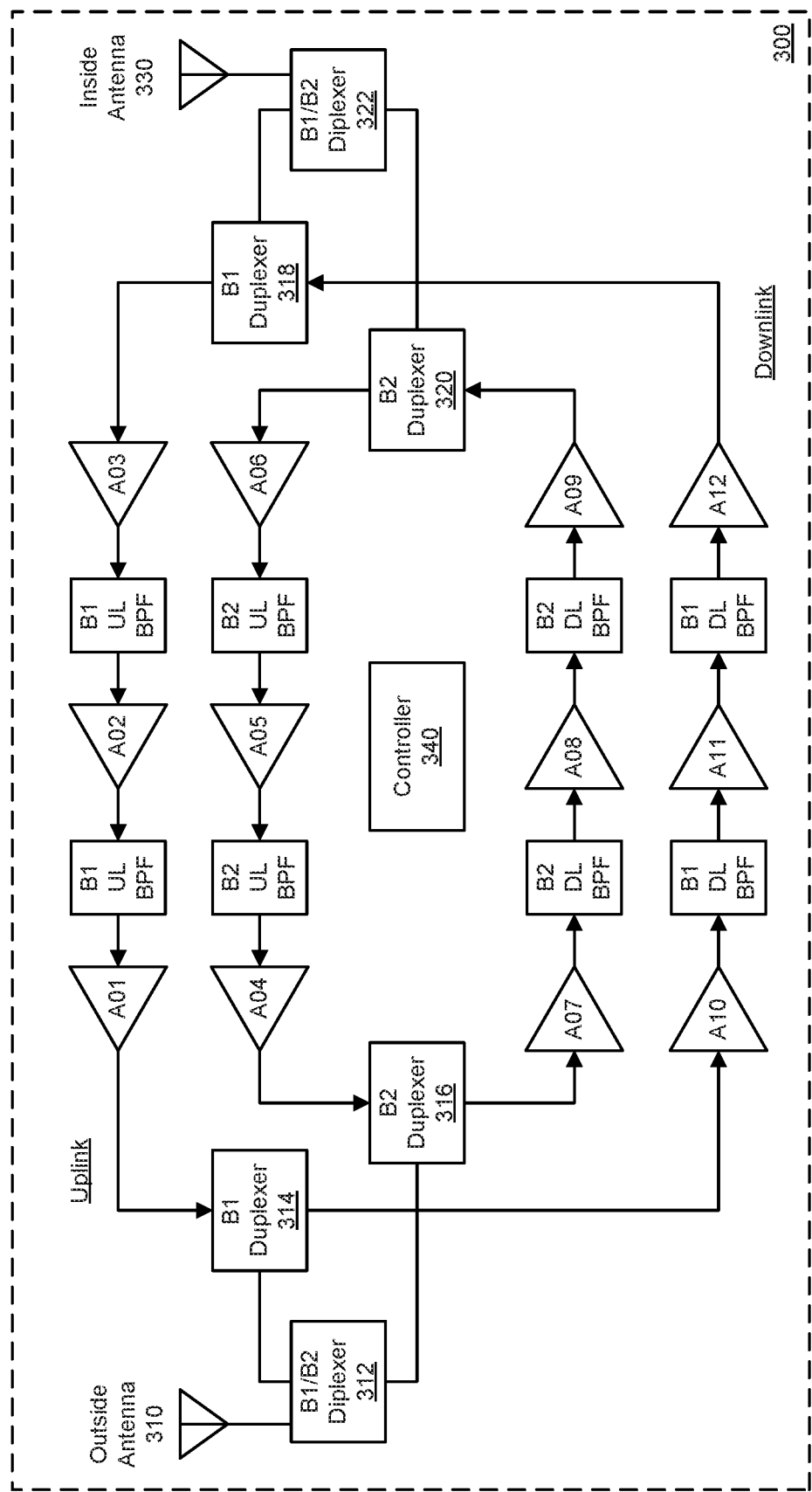
FIG. 3 illustrates a cellular signal booster configured to amplify uplink (UL) and downlink (DL) signals using a separate signal path for each UL frequency band and DL frequency band in accordance with an example.

FIG. 3 illustrates an exemplary cellular signal booster 300 configured to amplify uplink (UL) and downlink (DL) signals using a separate signal path for each UL frequency band and DL frequency band and a controller 340. The controller 340 can perform gain control, oscillation detection and various other functions. An outside antenna 310, or an integrated node antenna, can receive a downlink signal. For example, the downlink signal can be received from a base station (not shown). The downlink signal can be provided to a first B1/B2 diplexer 312, wherein B1 represents a first frequency band and B2 represents a second frequency band. The first B1/B2 diplexer 312 can create a B1 downlink signal path and a B2 downlink signal path. Therefore, a downlink signal that is associated with B1 can travel along the B1 downlink signal path to a first B1 duplexer 314, or a downlink signal that is associated with B2 can travel along the B2 downlink signal path to a first B2 duplexer 316. After passing the first B1 duplexer 314, the downlink signal can travel through a series of amplifiers (e.g., A10, A11 and A12) and downlink band pass filters (BPF) to a second B1 duplexer 318. Alternatively, after passing the first B2 duplexer 316, the downlink can travel through a series of amplifiers (e.g., A07, A08 and A09) and downlink band pass filters (BFF) to a second B2 duplexer 320. At this point, the downlink signal (B1 or B2) has been amplified and filtered in accordance with the type of amplifiers and BPFs included in the cellular signal booster 300. The downlink signals from the second B1 duplexer 318 or the second B2 duplexer 320, respectively, can be provided to a second B1/B2 diplexer 322. The second B1/B2 diplexer 322 can provide an amplified downlink signal to an inside antenna 330, or an integrated device antenna. The inside antenna 330 can communicate the amplified downlink signal to a wireless device (not shown), such as a mobile phone.

In one example, the inside antenna 330 can receive an uplink (UL) signal from the wireless device. The uplink signal can be provided to the second B1/B2 diplexer 322. The second B1/B2 diplexer 322 can create a B1 uplink signal path and a B2 uplink signal path. Therefore, an uplink signal that is associated with B2 can travel along the B1 uplink signal path to the second B1 duplexer 318, or an uplink signal that is associated with B2 can travel along the B2 uplink signal path to the second B2 duplexer 322. After passing the second B1 duplexer 318, the uplink signal can travel through a series of amplifiers (e.g., A01, A02 and A03) and uplink band pass filters (BPF) to the first B1 duplexer 314. Alternatively, after passing the second B2 duplexer 320, the uplink signal can travel through a series of amplifiers (e.g., A04, A05 and A06) and uplink band pass filters (BPF) to the first B2 duplexer 316. At this point, the uplink signal (B1 or B2) has been amplified and filtered in accordance with the type of amplifiers and BFFs included in the cellular signal booster 300. The uplink signals from the first B1 duplexer 314 or the first B2 duplexer 316, respectively, can be provided to the first B1/B2 diplexer 312. The first B1/B2 diplexer 312 can provide an amplified uplink signal to the outside antenna 310. The outside antenna can communicate the amplified uplink signal to the base station.

In one example, the cellular signal booster 300 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

In one configuration, the cellular signal amplifier can be a 5-band booster. In other words, the cellular signal amplifier can perform amplification and filtering for downlink and uplink signals having a frequency in bands B1, B2, B3 B4 and/or B5. In this configuration, the cellular signal amplifier can have three uplink radio frequency (RF) amplifiers and three downlink RF amplifiers for each frequency band, which results in a total of 30 RF amplifiers for the five bands.

Figure 4:
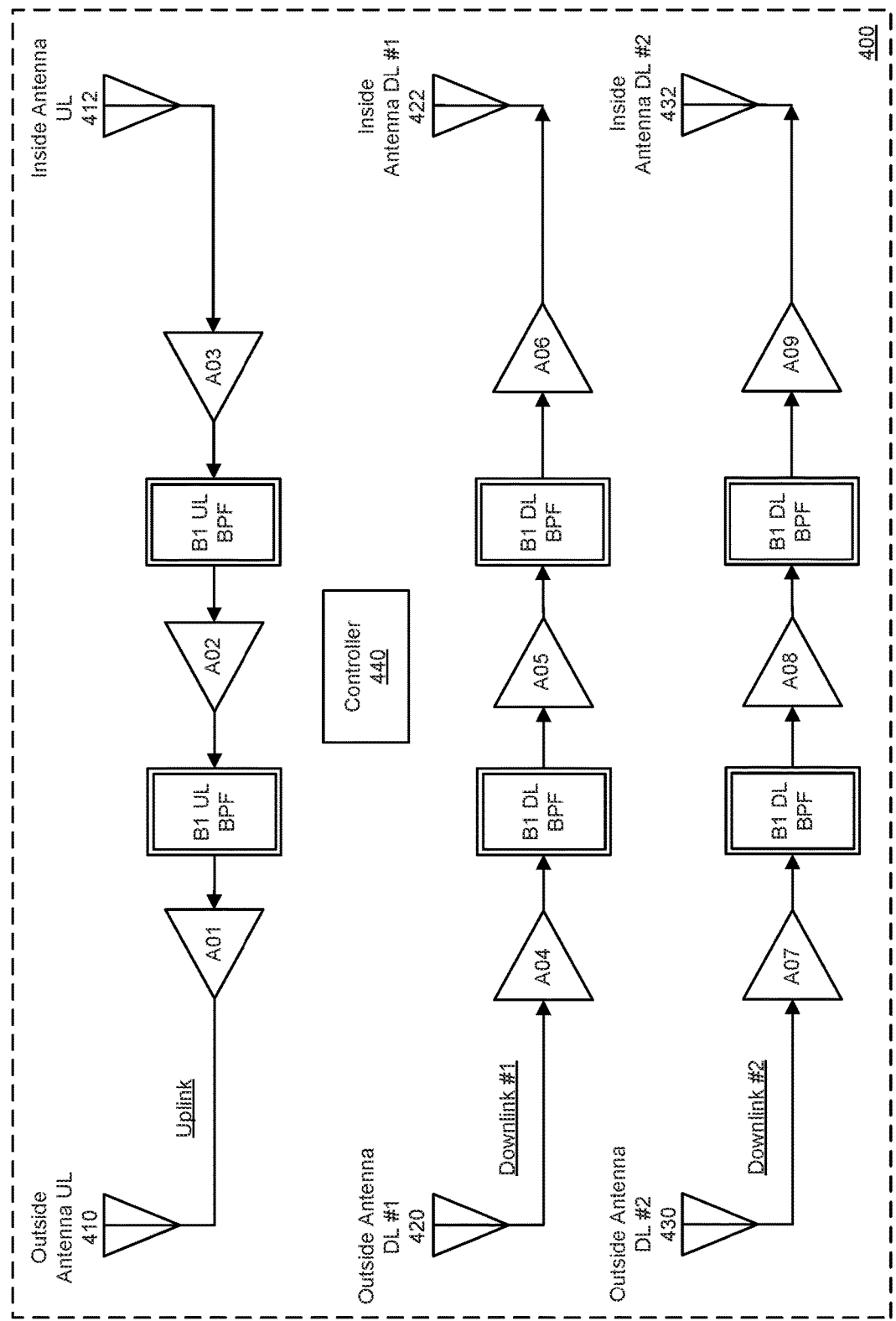
FIG. 4 illustrates a cellular signal booster configured to amplify uplink (UL) and downlink (DL) signals using one or more downlink signal paths and one or more uplink signal paths in accordance with an example.

FIG. 4 illustrates an exemplary cellular signal booster 400 configured to amplify uplink (UL) and downlink (DL) signals using one or more downlink signal paths and one or more uplink signal paths and a controller 440. The controller 440 can perform gain control, oscillation detection and various other functions. The cellular signal booster 400 can include a selected number of uplink transmission paths and a selected number of downlink transmission paths.

In one example, the cellular signal booster 400 can include an uplink transmission path that is communicatively coupled between an outside antenna UL 410 and an inside antenna UL 412. The uplink transmission path can amplify UL signals at a selected frequency band, such as band 1 (B1). The uplink transmission path can include a series of amplifiers (e.g., A01, A02 and A03) and uplink band pass filters (e.g., B1 UL BPFs).

In one example, the cellular signal booster 400 can include a first downlink transmission path that is communicatively coupled between an outside antenna DL #1 420 and an inside antenna DL #1 422. The first downlink transmission path can amplify DL signals at a selected frequency band. The selected frequency band can be band 4 (B4), band 2 (B2), band 25 (B25), band 12 (B12), band 13 (B13) or band 5 (B5). The first downlink transmission path can include a series of amplifiers (e.g., A04, A05 and A06) and downlink band pass filters (e.g., B1 DL BPFs).

In one example, the cellular signal booster 400 can include a second downlink transmission path that is communicatively coupled between an outside antenna DL #2 430 and an inside antenna DL #2 432. The second downlink transmission path can amplify DL signals at the selected frequency band (which is the same frequency band that is associated with the first downlink transmission path), or at an alternative frequency band. The second downlink transmission path can include a series of amplifiers (e.g., A07, A08 and A09) and downlink band pass filters (e.g., B1 DL BPFs).

In one configuration, the controller 440 can perform network protection in order to protect a cellular network from overload or noise floor increase. The controller 440 can perform network protection by adjusting a gain or noise power for each band in the uplink transmission paths based on data from each band in the downlink transmission paths. The data from each band in the downlink transmission paths can include a booster station coupling loss (BSCL) or a received signal strength indication (RSSI). The controller 440 can perform network protection in accordance with the Federal Communications Commission (FCC) Consumer Booster Rules, which necessitate that uplink signal paths and downlink signal paths are to work together for network protection. Therefore, if the cellular signal booster 400 includes multiple downlink signal chains and a single uplink signal chain, then each downlink signal chain can relate to or communicate with the single uplink signal chain for network protection purposes.

More specifically, in order to perform network protection, the controller 440 can identify a booster station coupling loss (BSCL) for each band in a selected number of downlink transmission paths. The controller 440 can identify one or more downlink transmission paths that correspond to a minimum BSCL for each band as compared to other downlink transmission paths in the signal booster 400. The controller 440 can adjust (e.g., increase or decrease) an uplink gain or noise power for each band in the selected number of uplink transmission paths based on the minimum BSCL for each band. When noise protection is performed at the signal booster 400, each band in the signal booster 400 can be adjusted separately. As a result, the signal booster 400 can protect a base station in the cellular network from becoming overloaded with uplink signals from the signal booster 400 that exceed a defined power threshold. As a non-limiting example, the controller 440 can reduce the uplink gain for each band on the uplink transmission path when the BSCL is relatively low.

In another example, in order to perform network protection, the controller 440 can identify a received signal strength indication (RSSI) for each band in the selected number of downlink transmission paths. The controller 440 can identify one or more downlink transmission paths that correspond to a maximum RSSI as compared to other downlink transmission paths in the signal booster. The controller 440 can adjust (e.g., increase or decrease) an uplink gain or noise power for each band in the selected number of uplink transmission paths based on the maximum RSSI for each band. As a result, the signal booster 400 can protect a base station in the cellular network from becoming overloaded with uplink signals from the signal booster 400 that exceed a defined power threshold.

In one example, a first DL path at a first band can be associated with a first RSSI, and a second DL path at a second band can be associated with a second RSSI. A maximum RSSI value can be identified between the first RSSI and the second RSSI. The uplink gain or noise power on the UL signal path at a selected band can be adjusted (e.g., increased or decreased) based on the maximum RSSI value in order to protect the base station in the cellular network. For example, the RSSI for each DL path can effectively estimate a distance between the cellular signal booster 400 and the base station. If the cellular signal booster 400 is located relatively close to the base station, then the RSSI can be relatively high, and therefore, the uplink gain or noise power on the UL signal path can be reduced for each band in order to protect the base station. If the uplink gain is not reduced, then the base station's noise floor can be raised and/or the base station can be overloaded with strong uplink signals from the cellular signal booster 400 (i.e., uplink signals that exceed a defined power threshold). In addition, reducing the uplink gain can protect the base station's uplink receive sensitivity. In another example, if the cellular signal booster 400 is located relatively far from the base station, then the RSSI can be relatively low, and therefore, the uplink gain or noise power on the UL signal path can be increased for each band.

In one configuration, as shown in FIG. 4, each of the uplink transmission paths and the downlink transmission paths in the cellular signal booster 400 can be communicatively coupled to a separate set of antennas. The separate set of antennas for each transmission path can result in the elimination of various types of components in the front end of the cellular signal booster 400. These components can include duplexers, diplexers, splitters, etc. These components can result in front end losses, which are undesirable for the cellular signal booster 400. For example, the use of these components can reduce uplink output power and/or reduce downlink sensitivity or noise power. Therefore, separating the antennas can eliminate the need for these additional components, thereby reducing front end losses.

In one example, the multiple signal paths in the cellular signal booster 400 can provide multiple-input multiple-output (MIMO)-like benefits. In other words, the multiple antennas in the cellular signal booster 400 can provide multiple signal paths, which can increase signal integrity, a coverage area, data transfer rates and signal sensitivity.

In one example, the selected number of uplink transmission paths in the cellular signal booster 400 does not equal the selected number of downlink transmission paths in the cellular signal booster 400. In other words, the cellular signal booster 400 can include an uneven number of signal chains (e.g., one uplink signal chain and two downlink signal chains). As an example, the cellular signal booster 400 can include an increased number of downlink signal chains in order to achieve increased downlink sensitivity and increased data rates. A larger number of downlink signal chains, as compared to the uplink signal chains, can be beneficial because downlink user traffic can generally be greater than uplink user traffic. Therefore, rather than combining multiple signal boosters, a single signal booster can combine multiple downlink signals chains with one uplink signal chain.

In one example, the cellular signal booster 400 can include a first set of antennas (e.g., antennas 412, 422, 432) that are operable to communicate with an access point (e.g., base station) in a wireless communication network. In another example, the cellular signal booster 400 can include a second set of antennas (e.g., antennas 410, 420, 430) that are operable to communicate with a mobile radio device in the wireless communication network.

In one configuration, the cellular signal booster 400 can include a single uplink antenna and a single downlink antenna, and the cellular signal booster 400 can have multiple uplink signal paths and/or downlink signal paths using duplexers or splitters on the front and back ends. For example, a duplexer or splitter can be communicatively coupled to the single uplink antenna, and a duplexer or splitter can be communicatively coupled to the single downlink antenna.

In one example, the downlink transmission paths and the uplink transmission paths can amplify downlink and uplink signals, respectively, at a selected frequency band. Non-limiting examples of the frequency band can include band 4 (B4), band 25 (B25), band 12 (B12), band 13 (B13) and band 5 (B5). In one example, B4 and B25 can be associated with a high frequency band, and B12, B13 and B5 can be associated with a low frequency band.

In one example, the cellular signal booster 400 can include a dual polarized antenna configured to receive downlink signals from an access point and transmit uplink signals to a mobile radio device. In this example, a first signal path (e.g., UL/DL or only UL) can run into a first port of the dual polarized antenna, and a second signal path (e.g., UL/DL or only DL) can run into a second port of the dual polarized antenna.

In one configuration, the cellular signal booster 400 can include two downlink antennas, wherein a first downlink antenna can be polarized at +45 degrees and the second downlink antenna can be polarized at −45 degrees. Similarly, the cellular signal booster 400 can include two uplink antennas, wherein a first uplink antenna can be polarized at +45 degrees and the second uplink antenna can be polarized at −45 degrees.

Figure 5:
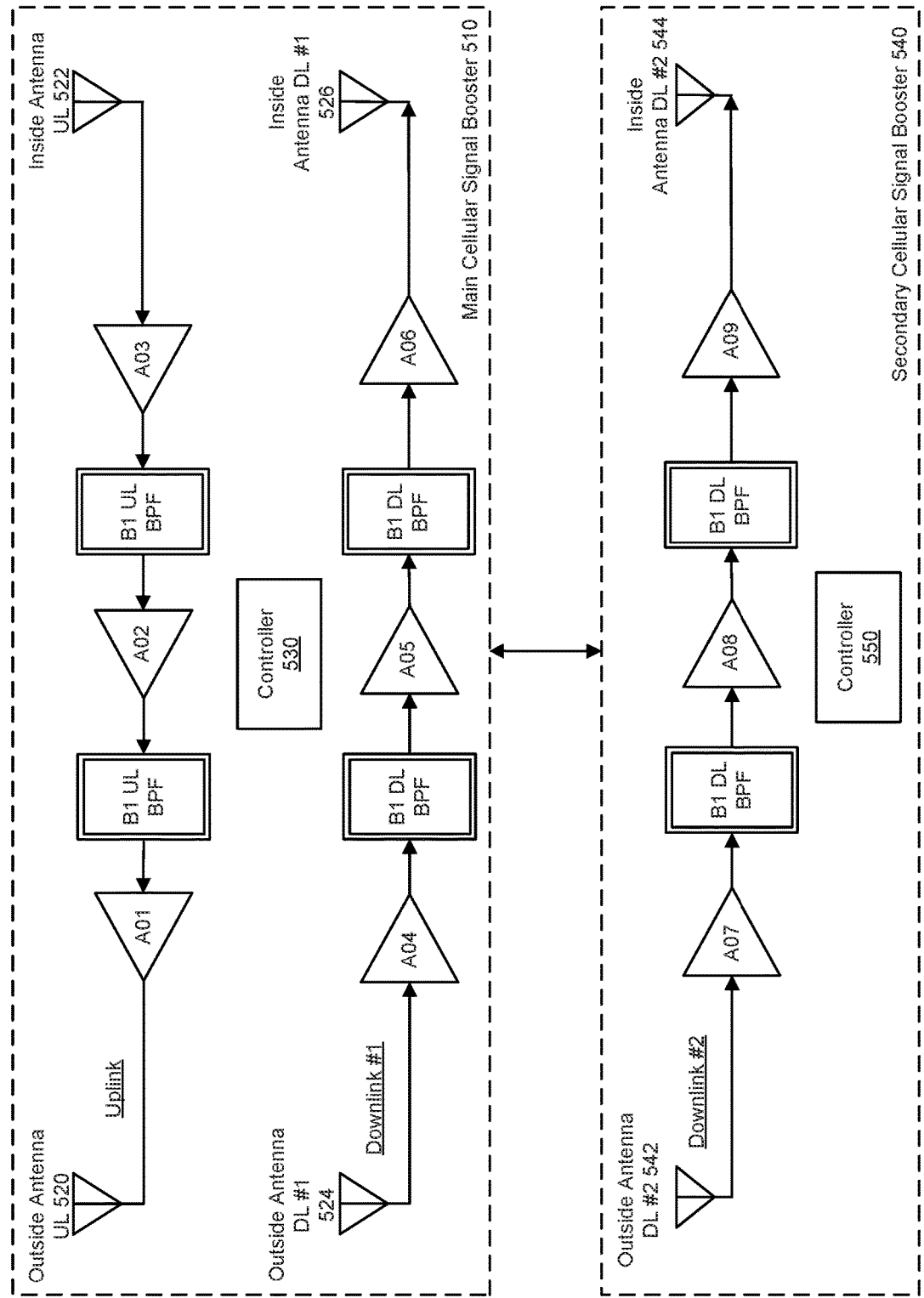
FIG. 5 illustrates a main cellular signal booster configured to amplify uplink (UL) and downlink (DL) signals and a secondary cellular signal booster configured to amplify additional signals in accordance with an example.

FIG. 5 illustrates an exemplary main cellular signal booster 510 configured to amplify uplink (UL) and downlink (DL) signals and a secondary cellular signal booster 540 configured to amplify additional signals. The main cellular signal booster 510 and the secondary cellular signal booster 540 can both be in a single package. For example, both the main cellular signal booster 510 and the secondary cellular signal booster 540 can be included in a multi-chain signal booster. As discussed in greater detail below, the secondary cellular signal booster 540 can communicate data to the main cellular signal booster 510 for the purpose of maintaining network protections. The main cellular signal booster 510 can include multiple transmission paths and a controller 530. The controller 530 can perform gain control, oscillation detection and various other functions.

In one example, the main cellular signal booster 510 can include an uplink transmission path that is communicatively coupled between an outside antenna UL 520 and an inside antenna UL 522. The uplink transmission path can amplify UL signals at a selected frequency band, such as band 1 (B1). The uplink transmission path can include a series of amplifiers (e.g., A01, A02 and A03) and uplink band pass filters. In addition, the main cellular signal booster 510 can include a downlink transmission path that is communicatively coupled between an outside antenna DL 524 and an inside antenna DL 526. The downlink transmission path can amplify DL signals at a selected frequency band, such as band 1 (B1). The downlink transmission path can include a series of amplifiers (e.g., A04, A05 and A06) and downlink band pass filters.

In one example, the secondary cellular signal booster 540 can include one or more additional transmission paths. For example, the secondary cellular signal booster 540 can include an additional downlink transmission path. The additional downlink transmission path can be communicatively coupled between an outside antenna DL #2 542 and an inside antenna DL #2 544. The additional downlink transmission path can amplify DL signals at a selected frequency band, such as band 1 (B1). The downlink transmission path can include a series of amplifiers (e.g., A07, A08 and A09) and downlink band pass filters.

In one configuration, the secondary cellular signal booster 540 can include a controller 550. The controller 550 in the secondary cellular signal booster 540 can communicate data to the controller 530 in the main cellular signal booster 510, wherein the data includes a booster station coupling loss (BSCL) or a received signal strength indication (RSSI).

For example, the controller 550 in the secondary cellular signal booster 540 can identify a booster station coupling loss (BSCL) for each band in the additional downlink transmission path(s). If the secondary cellular signal booster 540 includes multiple downlink transmission paths, then the controller 550 can identify a minimum BSCL for a particular downlink transmission path with respect to each band as compared to the other downlink transmission paths in the secondary cellular signal booster 540. The controller 550 in the secondary cellular signal booster 540 can send the minimum BSCL to the controller 530 in the main cellular signal booster 510, and the main cellular signal booster 510 can adjust an uplink gain or noise power for each band in one or more uplink transmission paths in the main cellular signal booster 510 and/or the secondary cellular signal booster 540. The controller 530 in the main cellular signal booster 510 can adjust the uplink gain or noise power based on the minimum BSCL for each band. As a result, a base station in the cellular network can be protected from becoming overloaded with uplink signals from the signal booster that exceed a defined power threshold.

In another example, the controller 550 in the secondary cellular signal booster 540 can identify a received signal strength indication (RSSI) for each band in the additional downlink transmission path. If the secondary cellular signal booster 540 includes multiple downlink transmission paths, then the controller 550 can identify a maximum RSSI for a particular downlink transmission path with respect to each band as compared to the other downlink transmission paths in the secondary cellular signal booster 540. The controller 550 in the secondary cellular signal booster 540 can send the maximum RSSI to the controller 530 in the main cellular signal booster 510, and the main cellular signal booster 510 can adjust an uplink gain or noise power for each band in one or more uplink transmission paths in the main cellular signal booster 510 and/or the secondary cellular signal booster 540. The controller 530 in the main cellular signal booster 510 can adjust the uplink gain or noise power based on the maximum RSSI for each band.

In one configuration, the controller 550 in the secondary cellular signal booster 540 can identify the minimum BSCL or the maximum RSSI with respect to each band in the downlink transmission paths, and then adjust an uplink gain or noise power for each band in one or more uplink transmission paths in the secondary cellular signal booster 540 and/or the main cellular signal booster 510 based on the minimum BSCL or the maximum RSSI.

Figure 6:
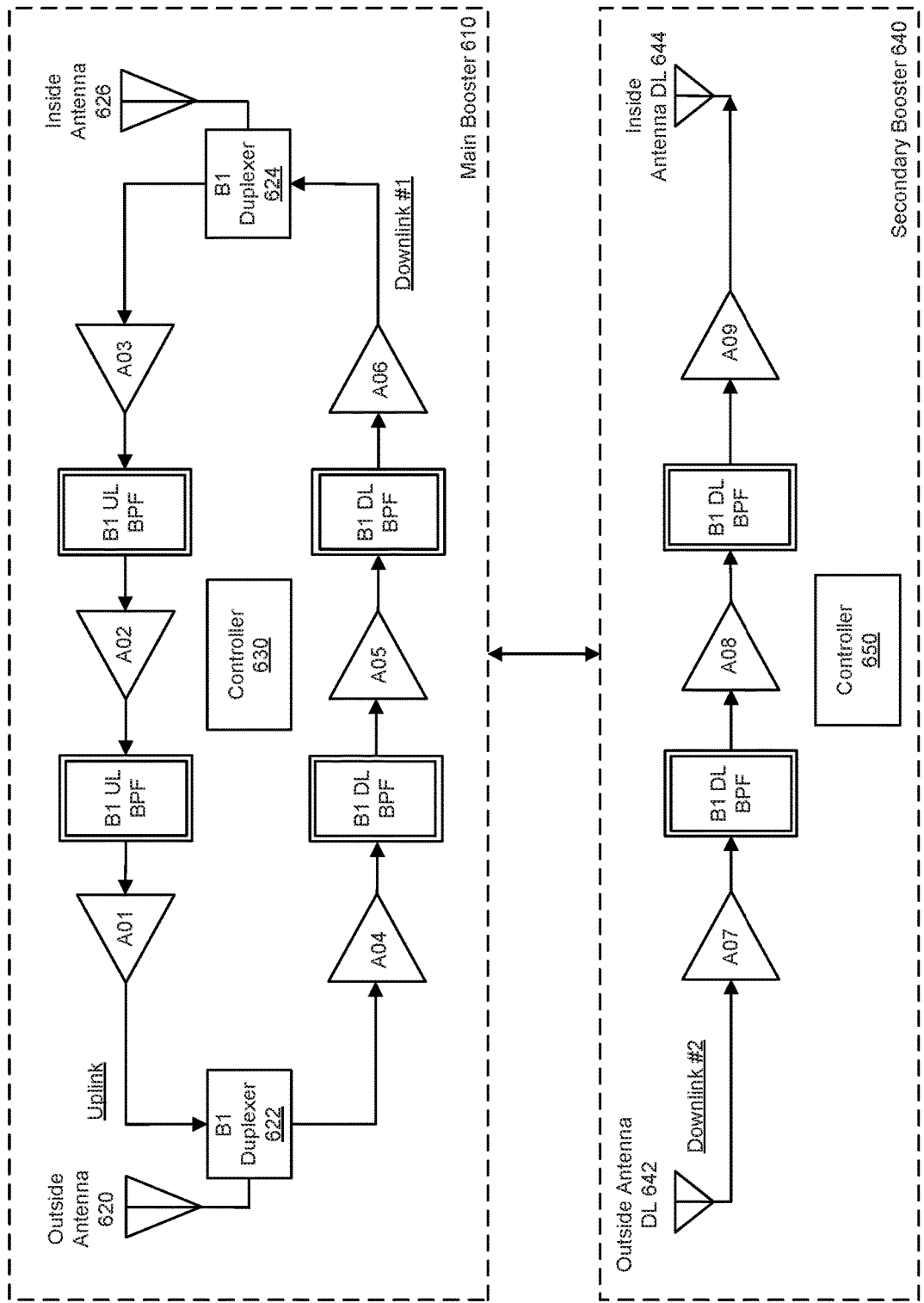
FIG. 6 illustrates a main cellular signal booster configuration to amplify uplink (UL) and downlink (DL) signals and a secondary cellular signal booster configured to amplify additional signals in accordance with an example.

FIG. 6 illustrates an exemplary main cellular signal booster 610 configured to amplify uplink (UL) and downlink (DL) signals and a secondary cellular signal booster 640 configured to amplify additional signals. The main cellular signal booster 610 and the secondary cellular signal booster 640 can both be in a single package. For example, both the main cellular signal booster 610 and the secondary cellular signal booster 640 can be included in a multi-chain signal booster. The main cellular signal booster 610 can include multiple transmission paths and a controller 630. In this example, the main cellular signal booster 610 can include a downlink transmission path and an uplink transmission path, which are communicatively coupled in between an outside antenna 620 and an inside antenna 626. The main cellular signal booster 610 can include a first B1 duplexer 622 and a second B1 duplexer 624 to create the downlink and uplink signal paths, respectively. Moreover, the secondary cellular signal booster 640 can include an additional downlink signal path that is communicatively coupled between an outside antenna DL 642 and an inside antenna DL 644. The secondary cellular signal booster 640 can include a controller 650 that communicates with the controller 630 of the main cellular signal booster 610. For example, the controller 650 in the secondary cellular signal booster 640 can communicate booster station coupling loss (BSCL) or received signal strength indication (RSSI) data to the controller 630 in the main cellular signal booster 610 for the purpose of maintaining network protections.

Figure 7:
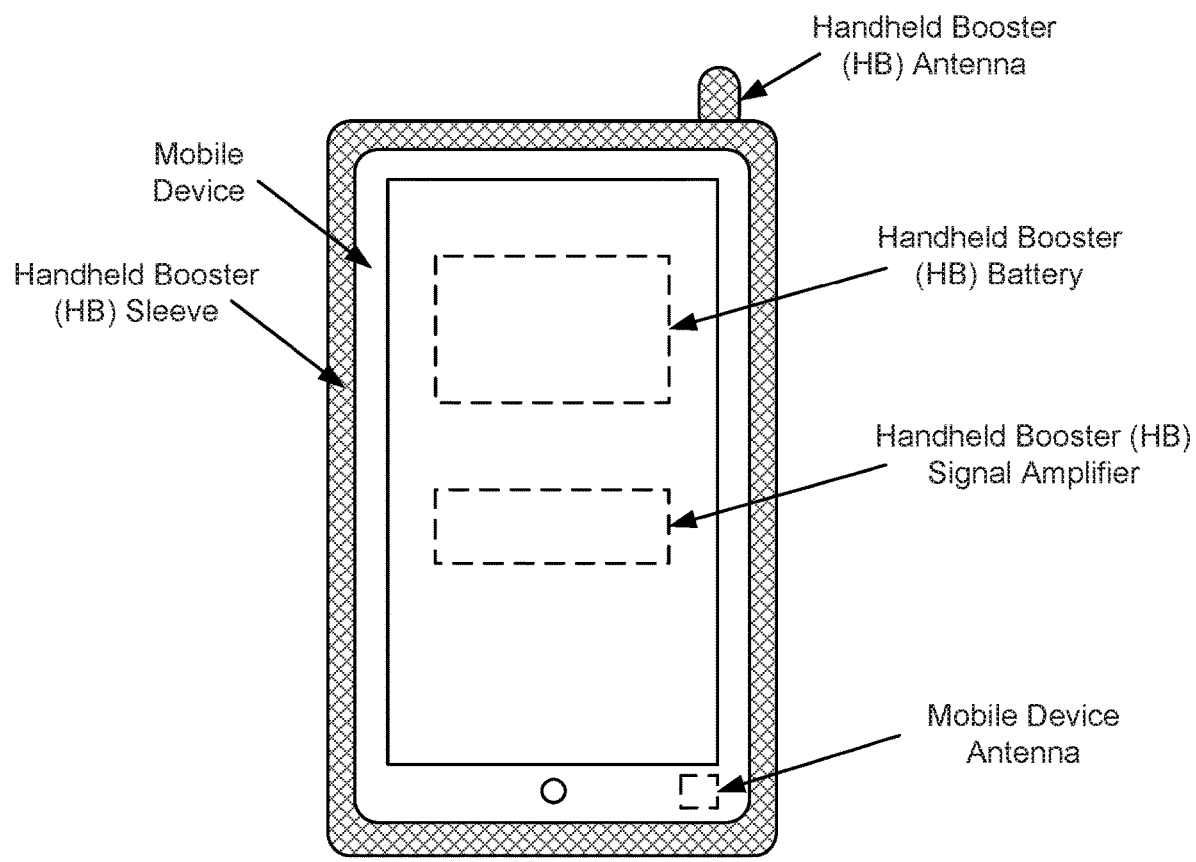
FIG. 7 illustrates a handheld booster in communication with a wireless device in accordance with an example.

FIG. 7 illustrates an exemplary handheld booster in communication with a mobile device. More specifically, the mobile device can be within a handheld booster (HB) sleeve. The HB sleeve can include a handheld booster (HB) antenna. The HB antenna can receive uplink signals from a mobile device antenna associated with the mobile device. The HB antenna can transmit the uplink signals to a base station. In addition, the HB antenna can receive downlink signals from the base station. The HB antenna can transmit the downlink signals to the mobile device antenna associated with the mobile device. In addition, the HB sleeve can include a HB battery to power the HB sleeve and/or the mobile device. Furthermore, the HB sleeve can include a HB signal amplifier to amplify downlink and/or uplink signals communicated from the mobile device and/or the base station.

Figure 8:
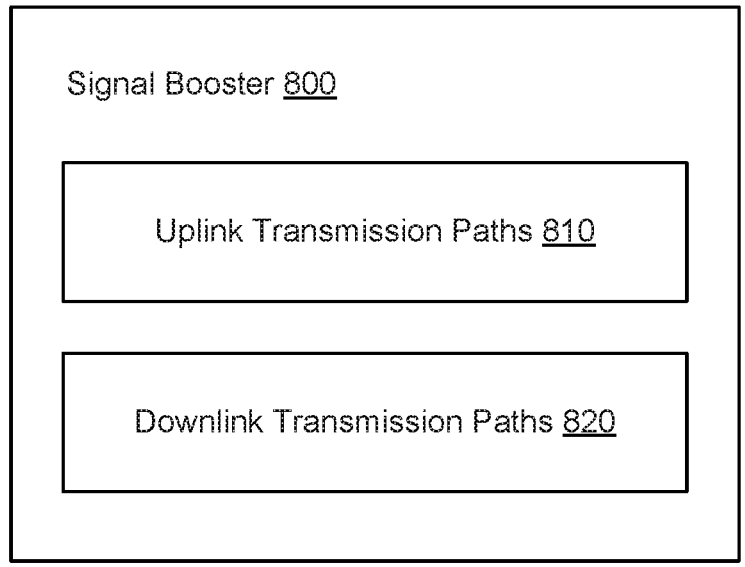
FIG. 8 depicts functionality of a signal booster in accordance with an example.

FIG. 8 illustrates an exemplary signal booster 800. The signal booster 800 may include a selected number of uplink transmission paths 810. Each uplink transmission path can be configured to amplify an uplink signal at a selected band. The signal booster can include a selected number of downlink transmission paths 820. Each downlink transmission path can be configured to amplify a downlink signal at a selected band. The selected number of uplink transmission paths 810 in the signal booster 800 may not equal the selected number of downlink transmission paths 820 in the signal booster 800.

Figure 9:
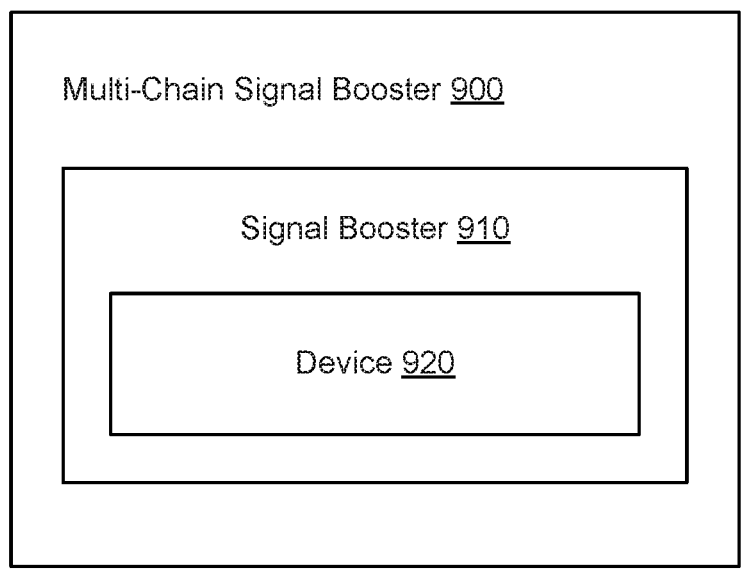
FIG. 9 depicts functionality of a multi-chain signal booster in accordance with an example.

FIG. 9 illustrates an exemplary multi-chain signal booster 900. The multi-chain signal booster 900 can include at least one signal booster 910 configured to amplify a signal of a selected band. The multi-chain signal booster 900 can include a device 920 in the signal booster 910 configured to report a base station coupling loss (BSCL) or a received signal strength indication (RSSI) to a booster station controller.

Figure 10:
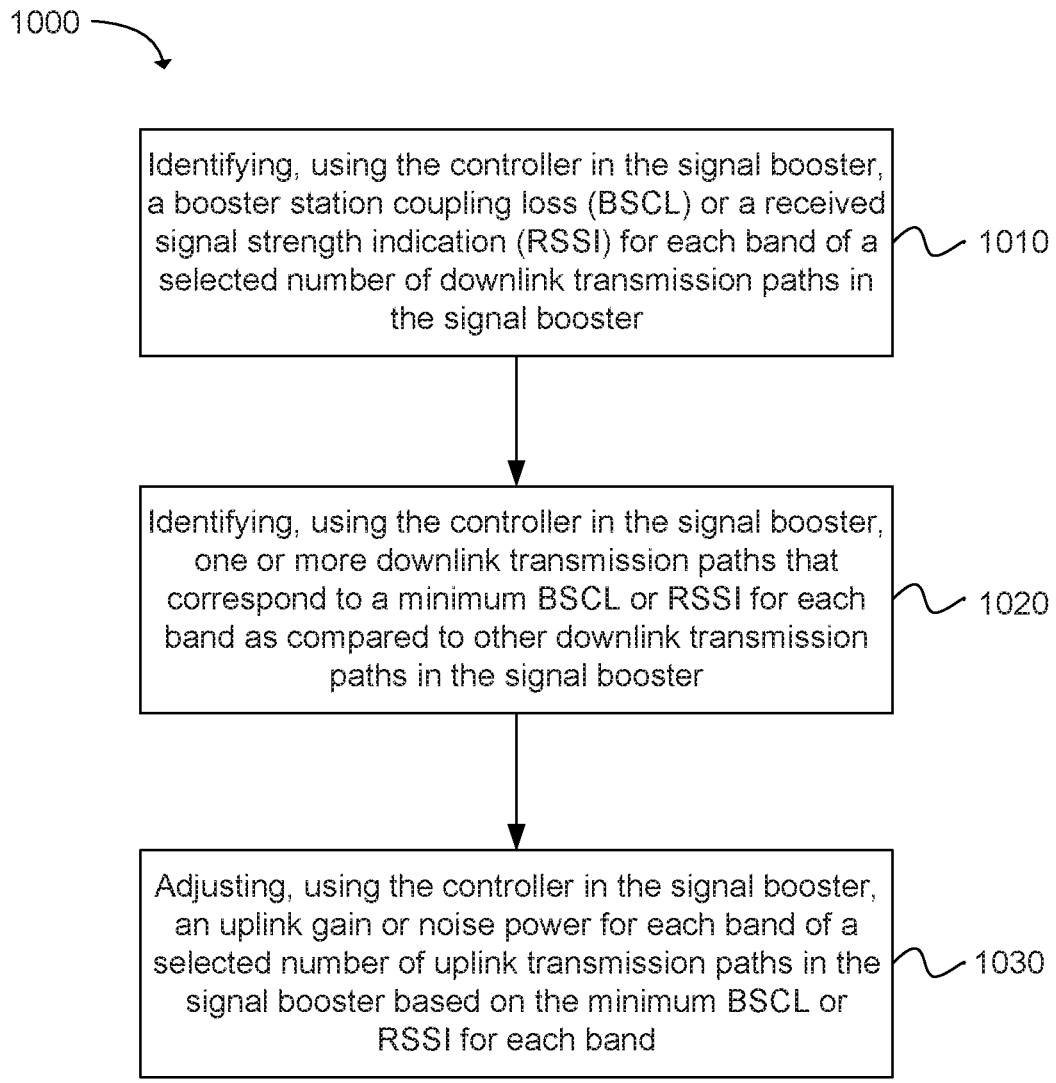
FIG. 10 depicts a flowchart of at least one non-transitory machine readable storage medium having instructions embodied thereon for performing network protection at a controller of a signal booster in accordance with an example.

Another example provides at least one machine readable storage medium having instructions 1000 embodied thereon for performing network protection at a controller of a signal booster, as shown in FIG. 10. The instructions can be executed on a machine, where the instructions are included on at least one computer readable medium or one non-transitory machine readable storage medium. The instructions when executed perform: identifying, using the controller in the signal booster, a booster station coupling loss (BSCL) or a received signal strength indication (RSSI) for each band of a selected number of downlink transmission paths in the signal booster, as in block 1010. The instructions when executed perform: identifying, using the controller in the signal booster, one or more downlink transmission paths that correspond to a minimum BSCL or RSSI for each band as compared to other downlink transmission paths in the signal booster, as in block 1020. The instructions when executed perform: applying, adjusting, using the controller in the signal booster, an uplink gain or noise power for each band of a selected number of uplink transmission paths in the signal booster based on the minimum BSCL or RSSI for each band, as in block 1030.

EXAMPLES

The following examples pertain to specific technology embodiments and point out specific features, elements, or actions that can be used or otherwise combined in achieving such embodiments.

Example 1 includes a signal booster, comprising: a selected number of uplink transmission paths, wherein each uplink transmission path is configured to amplify an uplink signal at a selected band; and a selected number of downlink transmission paths, wherein each downlink transmission path is configured to amplify a downlink signal at a selected band, wherein the selected number of uplink transmission paths in the signal booster does not equal the selected number of downlink transmission paths in the signal booster.

Example 2 includes the signal booster of Example 1, further comprising a controller operable to perform network protection by adjusting a gain or noise power for each band in the selected number of uplink transmission paths based on data from each band in the selected number of downlink transmission paths.

Example 3 includes the signal booster of any of Examples 1 to 2, wherein the data from each band in the selected number of downlink transmission paths includes a booster station coupling loss (BSCL) or a received signal strength indication (RSSI).

Example 4 includes the signal booster of any of Examples 1 to 3, further comprising a controller operable to protect a cellular network from overload or noise floor increase, the controller configured to: identify a booster station coupling loss (BSCL) for each band in the selected number of downlink transmission paths; identify one or more downlink transmission paths that correspond to a minimum BSCL for each band as compared to other downlink transmission paths in the signal booster; and adjust an uplink gain or noise power for each band in the selected number of uplink transmission paths based on the minimum BSCL for each band.

Example 5 includes the signal booster of any of Examples 1 to 4, further comprising a controller operable to protect a cellular network from overload or noise floor increase, the controller configured to: identify a received signal strength indication (RSSI) for each band in the selected number of downlink transmission paths; identify one or more downlink transmission paths that correspond to a maximum RSSI for each band as compared to other downlink transmission paths in the signal booster; and adjust an uplink gain or noise power for each band in the selected number of uplink transmission paths based on the maximum RSSI for each band.

Example 6 includes the signal booster of any of Examples 1 to 5, wherein an uplink transmission path is communicatively coupled between a first antenna and a second antenna.

Example 7 includes the signal booster of any of Examples 1 to 6, wherein a downlink transmission path is communicatively coupled between a first antenna and a second antenna.

Example 8 includes the signal booster of any of Examples 1 to 7, further comprising: one or more first antennas configured to communicate with an access point in a wireless communication network; and one or more second antennas configured to communicate with a mobile radio device in the wireless communication network.

Example 9 includes the signal booster of any of Examples 1 to 8, further comprising multiple antennas communicatively coupled to at least one of the selected number of uplink transmission paths and the selected number of downlink transmission paths in order to increase data transfer rates, signal integrity, or coverage area.

Example 10 includes the signal booster of any of Examples 1 to 9, wherein: an uplink transmission path includes a selected number of amplifiers and a selected number of band pass filters for a selected band; and a downlink transmission path includes a selected number of amplifiers and a selected number of band pass filters for a selected band.

Example 11 includes the signal booster of any of Examples 1 to 10, wherein the signal booster comprises one uplink transmission path and one downlink transmission path, wherein additional downlink transmission paths are included in a secondary signal booster that communicates data to the signal booster for maintenance of network protections.

Example 12 includes the signal booster of any of Examples 1 to 11, wherein the signal booster and the secondary signal booster are included in a single package.

Example 13 includes the signal booster of any of Examples 1 to 12, further comprising a dual polarized antenna configured to receive downlink signals from an access point and transmit uplink signals to a mobile radio device.

Example 14 includes the signal booster of any of Examples 1 to 13, wherein the signal booster is included in a sleeve that is attached to a wireless device.

Example 15 includes the signal booster of any of Examples 1 to 14, wherein the selected band for the uplink signal and the downlink signal is at least one of: band 4 (B4), band 2 (B2), band 25 (B25), band 12 (B12), band 13 (B13) or band 5 (B5).

Example 16 includes a multi-chain signal booster, comprising: at least one signal booster configured to amplify a signal of a selected band; and a device in the signal booster configured to report a base station coupling loss (BSCL) or a received signal strength indication (RSSI) to a booster station controller.

Example 17 includes the multi-chain signal booster of Example 16, wherein the device is configured to communicate the BSCL or the RSSI for each band in one or more downlink transmission paths in the signal booster to the booster station controller to enable the booster station controller to adjust a gain or noise power for each band in one or more uplink transmission paths located in the signal booster.

Example 18 includes the multi-chain signal booster of any of Examples 16 to 17, wherein the at least one signal booster includes at least one downlink transmission path or at least one uplink transmission path.

Example 19 includes the multi-chain signal booster of any of Examples 16 to 18, wherein the at least one signal booster includes at least one downlink transmission path and at least one uplink transmission path.

Example 20 includes the multi-chain signal booster of any of Examples 16 to 19, wherein each booster path in the signal booster includes a selected number of amplifiers and a selected number of band pass filters for a selected band.

Example 21 includes the multi-chain signal booster of any of Examples 16 to 20, wherein each booster path in the signal booster is communicatively coupled between a first antenna and a second antenna.

Example 22 includes at least one non-transitory machine readable storage medium having instructions embodied thereon for performing network protection at a controller of a signal booster, the instructions when executed perform the following: identifying, using the controller in the signal booster, a booster station coupling loss (BSCL) or a received signal strength indication (RSSI) for each band of a selected number of downlink transmission paths in the signal booster; identifying, using the controller in the signal booster, one or more downlink transmission paths that correspond to a minimum BSCL or RSSI for each band as compared to other downlink transmission paths in the signal booster; and adjusting, using the controller in the signal booster, an uplink gain or noise power for each band of a selected number of uplink transmission paths in the signal booster based on the minimum BSCL or RSSI for each band.

Example 23 includes the at least one non-transitory machine readable storage medium of Example 22, wherein the selected number of uplink transmission paths in the signal booster does not equal the selected number of downlink transmission paths in the signal booster.

Example 24 includes the at least one non-transitory machine readable storage medium of any of Examples 22 to 23, wherein each band of the selected number of downlink transmission paths and each band of the selected number of uplink transmission paths is one of: band 4 (B4), band 2 (B2), band 25 (B25), band 12 (B12), band 13 (B13) or band 5 (B5).

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A signal booster, comprising:
  a selected number of uplink transmission paths, wherein each uplink transmission path is configured to amplify an uplink signal on a selected band; and
  a selected number of downlink transmission paths, wherein each downlink transmission path is configured to amplify a downlink signal on a selected band,
  wherein one or more of the selected number of uplink transmission paths or the selected number of downlink transmission paths include multiple parallel signal paths that are redundant for a same selected band, and are configured to be used simultaneously to achieve an increased data transfer rate, wherein the signal booster includes separate antenna ports for each of the multiple parallel signal paths that are redundant for the same selected band, wherein the separate antenna ports are configured to be communicatively coupled to separate antennas.

2. The signal booster of claim 1, further comprising a controller operable to perform network protection by adjusting a gain or noise power for each band in the selected number of uplink transmission paths based on data from each band in the selected number of downlink transmission paths.

3. The signal booster of claim 2, wherein the data from each band in the selected number of downlink transmission paths includes a booster station coupling loss (BSCL) or a received signal strength indication (RSSI).

4. The signal booster of claim 1, further comprising a controller operable to protect a cellular network from overload or noise floor increase, the controller configured to:
identify a booster station coupling loss (BSCL) for each band in the selected number of downlink transmission paths;
identify one or more downlink transmission paths that correspond to a minimum BSCL for each band as compared to other downlink transmission paths in the signal booster; and
adjust an uplink gain or noise power for each band in the selected number of uplink transmission paths based on the minimum BSCL for each band.

5. The signal booster of claim 1, further comprising a controller operable to protect a cellular network from overload or noise floor increase, the controller configured to:
identify a received signal strength indication (RSSI) for each band in the selected number of downlink transmission paths;
identify one or more downlink transmission paths that correspond to a maximum RSSI for each band as compared to other downlink transmission paths in the signal booster; and
adjust an uplink gain or noise power for each band in the selected number of uplink transmission paths based on the maximum RSSI for each band.

6. The signal booster of claim 1, wherein:
an uplink transmission path is communicatively coupled between a first antenna and a second antenna; or
a downlink transmission path is communicatively coupled between the first antenna and the second antenna.

7. The signal booster of claim 1, further comprising:
one or more first antennas configured to communicate with an access point in a wireless communication network; and
one or more second antennas configured to communicate with a mobile radio device in the wireless communication network.

8. The signal booster of claim 1, further comprising multiple antennas communicatively coupled to at least one of the selected number of uplink transmission paths and the selected number of downlink transmission paths in order to increase one or more of: data transfer rates, signal integrity, or coverage area.

9. The signal booster of claim 1, wherein:
an uplink transmission path includes a selected number of amplifiers and a selected number of band pass filters for a selected band; and
a downlink transmission path includes a selected number of amplifiers and a selected number of band pass filters for a selected band.

10. The signal booster of claim 1, further comprising a dual polarized antenna configured to receive downlink signals from an access point and transmit uplink signals to the access point.

11. The signal booster of claim 1, wherein the signal booster is included in a sleeve that is attached to a wireless device.

12. The signal booster of claim 1, wherein the selected number of uplink transmission paths in the signal booster does not equal the selected number of downlink transmission paths in the signal booster.

13. The signal booster of claim 1, wherein the selected number of uplink transmission paths in the signal booster is equal to the selected number of downlink transmission paths in the signal booster.

14. The signal booster of claim 1, wherein the uplink signal and the downlink signal are communicated in at least one of: band 4 (B4), band 2 (B2), band 25 (B25), band 12 (B12), band 13 (B13) or band 5 (B5).

15. A multi-chain signal booster, comprising:
at least one signal booster configured to amplify a signal of a selected band; and
a device in the signal booster configured to report a base station coupling loss (BSCL) to a booster station controller,
wherein the at least one signal booster includes a selected number of uplink transmission paths or a selected number of downlink transmission paths that include multiple parallel signal paths that are redundant for a same selected band and are configured to be used simultaneously to achieve an increased data rate,
wherein the multi-chain signal booster includes separate antenna ports for each of the multiple parallel signal paths that are redundant for the same selected band, wherein the separate antenna ports are configured to be communicatively coupled to separate antennas.

16. The multi-chain signal booster of claim 15, wherein the device is configured to communicate the BSCL or a received signal strength indication (RSSI) for each band in one or more downlink transmission paths in the signal booster to the booster station controller to enable the booster station controller to adjust a gain or noise power for each band in one or more uplink transmission paths located in the signal booster.

17. The multi-chain signal booster of claim 15, wherein each booster path in the signal booster includes a selected number of amplifiers and a selected number of band pass filters for a selected band.

18. The multi-chain signal booster of claim 15, wherein each booster path in the signal booster is communicatively coupled between a first antenna and a second antenna.

19. The multi-chain signal booster of claim 15, wherein the selected number of uplink transmission paths does not equal the selected number of downlink transmission paths.

20. The multi-chain signal booster of claim 15, wherein the selected number of uplink transmission paths is equal to the selected number of downlink transmission paths.

21. At least one non-transitory machine readable storage medium having instructions embodied thereon for performing network protection at a controller of a signal booster, the instructions when executed perform the following:
identifying, using the controller in the signal booster, a booster station coupling loss (BSCL) for each band of a selected number of downlink transmission paths in the signal booster;
identifying, using the controller in the signal booster, one or more downlink transmission paths that correspond to a minimum BSCL for each band as compared to other downlink transmission paths in the signal booster; and adjusting, using the controller in the signal booster, an uplink gain or noise power for each band of a selected number of uplink transmission paths in the signal booster based on the minimum BSCL for each band, wherein one or more of the selected number of downlink transmission paths or the selected number of uplink transmission paths include multiple parallel signal paths that are redundant for a same selected band and are configured to be used simultaneously to achieve an increased data rate, wherein the signal booster includes separate antenna ports for each of the multiple parallel signal paths that are redundant for the same selected band, wherein the separate antenna ports are configured to be communicatively coupled to separate antennas.

22. The at least one non-transitory machine readable storage medium of claim 21, wherein the selected number of uplink transmission paths in the signal booster does not equal the selected number of downlink transmission paths in the signal booster.

23. The at least one non-transitory machine readable storage medium of claim 21, wherein the selected number of uplink transmission paths in the signal booster is equal to the selected number of downlink transmission paths in the signal booster.

24. The at least one non-transitory machine readable storage medium of claim 21, wherein each band of the selected number of downlink transmission paths and each band of the selected number of uplink transmission paths is one of: band 4 (B4), band 2 (B2), band 25 (B25), band 12 (B12), band 13 (B13) or band 5 (B5).

* * * * *